United States Patent
Kunze et al.

(10) Patent No.: US 9,665,356 B2
(45) Date of Patent: May 30, 2017

(54) CONFIGURATION OF AN APPLICATION IN A COMPUTING PLATFORM

(75) Inventors: Tobias Kunze, Palo Alto, CA (US); Ram Ranganathan, Palo Alto, CA (US); Krishna Raman, Union City, CA (US); Rajat Chopra, Sunnyvale, CA (US)

(73) Assignee: Red Hat, Inc., Raleigh, NC (US)

( * ) Notice: Subject to any disclaimer, the term of this patent is extended or adjusted under 35 U.S.C. 154(b) by 351 days.

(21) Appl. No.: 13/363,138

(22) Filed: Jan. 31, 2012

(65) Prior Publication Data
US 2013/0198718 A1    Aug. 1, 2013

(51) Int. Cl.
*G06F 9/44* (2006.01)
*G06F 9/445* (2006.01)

(52) U.S. Cl.
CPC ............... *G06F 8/61* (2013.01); *G06F 8/65* (2013.01); *G06F 9/44505* (2013.01)

(58) Field of Classification Search
USPC ........................................................ 717/121
See application file for complete search history.

(56) References Cited

U.S. PATENT DOCUMENTS

| | | | |
|---|---|---|---|
| 5,524,253 A | 6/1996 | Pham et al. | |
| 5,809,235 A | 9/1998 | Sharma et al. | |
| 5,870,605 A | 2/1999 | Bracho et al. | |
| 5,913,061 A | 6/1999 | Gupta et al. | |
| 6,272,386 B1 | 8/2001 | McLaughlin et al. | |
| 6,360,334 B1 | 3/2002 | Kavanagh et al. | |
| 6,442,754 B1 * | 8/2002 | Curtis | G06F 8/61 707/999.104 |
| 6,654,950 B1 | 11/2003 | Barnishan | |
| 6,681,323 B1 | 1/2004 | Fontanesi et al. | |
| 6,701,521 B1 * | 3/2004 | McLlroy et al. | 717/173 |
| 7,024,450 B1 * | 4/2006 | Deo | G06F 15/16 709/201 |
| 7,080,159 B2 | 7/2006 | Chu et al. | |
| 7,096,258 B2 | 8/2006 | Hunt et al. | |
| 7,228,541 B2 | 6/2007 | Gupton et al. | |
| 7,275,243 B2 * | 9/2007 | Gibbons et al. | 717/159 |
| 7,310,801 B2 | 12/2007 | Burkhardt et al. | |
| 7,370,322 B1 | 5/2008 | Matena et al. | |
| 7,418,700 B2 * | 8/2008 | Zimniewicz | G06F 8/61 717/169 |
| 7,426,512 B1 | 9/2008 | Ben-Natan | |

(Continued)

OTHER PUBLICATIONS

Arnold, et al., "Pattern Based SOA Deployment"; 2007 Springer-Verlag; [retrieved on May 30, 2015]; Retrieved from Internet <URL: http://www.cs.nyu.edu/~totok/professional/papers/pattern-soa-deployment.pdf>;pp. 1-12.*

(Continued)

*Primary Examiner* — Marina Lee
(74) *Attorney, Agent, or Firm* — Lowenstein Sandler LLP

(57) ABSTRACT

Upon receiving application code and an application descriptor of an application, a platform executing on a computer system identifies a capability to be used by the application based on the application descriptor. The platform determines a component that provides the capability based on a component descriptor of the component. The platform then configures the application and the component for execution on the platform.

17 Claims, 12 Drawing Sheets

(56) References Cited

U.S. PATENT DOCUMENTS

| | | | |
|---|---|---|---|
| 7,467,378 B1 | 12/2008 | Sobel | |
| 7,519,964 B1 | 4/2009 | Islam et al. | |
| 7,607,126 B2 | 10/2009 | Read | |
| 7,653,902 B2* | 1/2010 | Bozak et al. | 717/177 |
| 7,676,806 B2* | 3/2010 | Curtis et al. | 717/177 |
| 7,743,373 B2 | 6/2010 | Avram et al. | |
| 7,836,458 B1* | 11/2010 | Gwozdz et al. | 719/320 |
| 7,870,539 B2* | 1/2011 | Wookey | 717/124 |
| 7,895,591 B2 | 2/2011 | Spears | |
| 7,971,047 B1* | 6/2011 | Vlaovic et al. | 713/1 |
| 8,005,788 B2* | 8/2011 | Leroux et al. | 707/624 |
| 8,032,880 B2 | 10/2011 | Konersmann et al. | |
| 8,087,015 B2* | 12/2011 | Pogrebinsky et al. | 717/172 |
| 8,112,505 B1 | 2/2012 | Ben-Shaul et al. | |
| 8,122,446 B2 | 2/2012 | Moore et al. | |
| 8,146,075 B2 | 3/2012 | Mahajan | |
| 8,151,245 B2 | 4/2012 | Oberlin et al. | |
| 8,156,489 B2 | 4/2012 | Kane | |
| 8,181,166 B2 | 5/2012 | Shinn et al. | |
| 8,225,281 B1 | 7/2012 | Hardinger et al. | |
| 8,230,395 B1 | 7/2012 | Koh et al. | |
| 8,302,093 B2 | 10/2012 | Berg et al. | |
| 8,312,446 B2* | 11/2012 | Kaminsky et al. | 717/175 |
| 8,402,452 B2 | 3/2013 | Baratti et al. | |
| 8,434,077 B2* | 4/2013 | Chess et al. | 717/168 |
| 8,484,637 B2 | 7/2013 | Farhangi et al. | |
| 8,499,296 B2 | 7/2013 | Konersmann et al. | |
| 8,510,728 B2 | 8/2013 | Burckart et al. | |
| 8,607,192 B2* | 12/2013 | Adhikary et al. | 717/120 |
| 8,621,453 B2 | 12/2013 | Wookey | |
| 8,627,311 B2 | 1/2014 | Auer | |
| 8,694,981 B2* | 4/2014 | Federighi | G06F 8/61 |
| | | | 717/164 |
| 8,706,852 B2* | 4/2014 | Kunze | G06F 9/5061 |
| | | | 370/252 |
| 8,769,481 B2* | 7/2014 | Chen | 717/102 |
| 8,910,145 B2 | 12/2014 | Baraldi et al. | |
| 9,009,663 B2* | 4/2015 | Kunze | G06F 8/62 |
| | | | 717/106 |
| 9,032,388 B1 | 5/2015 | Watson et al. | |
| 9,043,747 B2* | 5/2015 | Eksten et al. | 717/105 |
| 9,170,797 B2 | 10/2015 | Raman | |
| 9,262,238 B2* | 2/2016 | Kunze | G06F 9/542 |
| 2001/0044304 A1 | 11/2001 | Truong et al. | |
| 2002/0010764 A1 | 1/2002 | Spicer | |
| 2002/0111942 A1 | 8/2002 | Campbell et al. | |
| 2002/0129041 A1 | 9/2002 | Anderson et al. | |
| 2004/0049481 A1 | 3/2004 | Blevins | |
| 2004/0060055 A1 | 3/2004 | Kukura et al. | |
| 2005/0015496 A1 | 1/2005 | Guo et al. | |
| 2005/0102665 A1 | 5/2005 | Barta et al. | |
| 2005/0265247 A1 | 12/2005 | Bourke-Dunphy et al. | |
| 2005/0289536 A1* | 12/2005 | Nayak et al. | 717/174 |
| 2005/0289538 A1 | 12/2005 | Black-Ziegelbein et al. | |
| 2006/0031831 A1 | 2/2006 | Templine et al. | |
| 2006/0064573 A1 | 3/2006 | Rolfs | |
| 2006/0080413 A1 | 4/2006 | Oprea et al. | |
| 2006/0230314 A1* | 10/2006 | Sanjar et al. | 714/26 |
| 2007/0006218 A1* | 1/2007 | Vinberg | G06F 8/61 |
| | | | 717/174 |
| 2008/0052676 A1* | 2/2008 | Wookey | 717/120 |
| 2008/0059214 A1* | 3/2008 | Vinberg | G06F 8/61 |
| | | | 709/221 |
| 2008/0168436 A1 | 7/2008 | Shwartz et al. | |
| 2008/0294777 A1 | 11/2008 | Karve et al. | |
| 2008/0306798 A1 | 12/2008 | Anke et al. | |
| 2009/0210869 A1* | 8/2009 | Gebhart | G06F 8/60 |
| | | | 717/174 |
| 2010/0192143 A1 | 7/2010 | Ingle et al. | |
| 2011/0295984 A1* | 12/2011 | Kunze | G06F 8/62 |
| | | | 709/220 |
| 2012/0030672 A1* | 2/2012 | Zygmuntowicz et al. | 718/1 |
| 2012/0117212 A1* | 5/2012 | Fries | 709/223 |
| 2012/0117560 A1* | 5/2012 | Vorthmann et al. | 717/177 |
| 2012/0311549 A1* | 12/2012 | Liu | G06Q 40/06 |
| | | | 717/151 |
| 2013/0054776 A1* | 2/2013 | Kunze | G06F 9/5061 |
| | | | 709/224 |
| 2013/0198718 A1* | 8/2013 | Kunze | G06F 8/61 |
| | | | 717/121 |
| 2013/0198719 A1* | 8/2013 | Raman | G06F 8/61 |
| | | | 717/121 |
| 2013/0198763 A1 | 8/2013 | Kunze et al. | |
| 2015/0295824 A1* | 10/2015 | Chopra | G06F 9/45558 |
| | | | 709/223 |

OTHER PUBLICATIONS

Office Action mailed Jan. 23, 2014 for U.S. Appl. No. 13/363,150 (30 pages).
Office Action mailed Feb. 4, 2014 for U.S. Appl. No. 13/363,173 (16 pages).
Office Action mailed Aug. 11, 2014 for U.S. Appl. No. 13/363,150.
Office Action mailed Jul. 8, 2014 for U.S. Appl. No. 13/363,173.
Office Action mailed Dec. 11, 2014 for U.S. Appl. No. 13/363,150.
Office Action mailed Dec. 10, 2014 for U.S. Appl. No. 13/363,173.
Office Action mailed Mar. 30, 2015 for U.S. Appl. No. 13/363,173.
USPTO, Advisory Action mailed Nov. 7, 2014 for U.S. Appl. No. 13/363,150.
USPTO, Office Action mailed Jul. 7, 2015 for U.S. Appl. No. 13/363,150.
USPTO, Notice of Allowance mailed Oct. 7, 2015 for U.S. Appl. No. 13/363,150.
USPTO, Advisory Action mailed Sep. 12, 2014 for U.S. Appl. No. 13/363,173.
USPTO, Notice of Allowance mailed Jun. 23, 2015 for U.S. Appl. No. 13/363,173.
Martel et al., "Remote Management of Distributed Applications", 2004 IEEE, retrieved on Jun. 17, 2015, retrieved from Internet <ieeexplore.ieee.org/stamp/stamp.jsp?tp=&arnumber=1271441>; pp. 1-8.
Lacour et al., "Generic Application Description Model: Toward Automatic Deployment of Applications on Computational Grids"; 20005 IEEE: retrieved on Jun. 17, 2015; Retrieved from Internet <dl.acm.org/citation.cfm?d=1253467.1253509?>; pp. 284-287.
Niemela et al., "Survey of Requirements and Solutions for Ubiquitous Software"; ACM, retrieved on Jun. 17, 2015; Retrieved from Internet <dl.acm.org/citation.cfm>; Mobile Ubiquitous Computing Conference, Oct. 2004, pp. 71-78, Washington DC, State, USA.
Hussain et al., "Deployment of IEC 61499 Compliant Distributed Control Applications", 2007 IEEE; retrieved on Jun. 17, 2015, Retrieved from internet <ieeexplore.ieee.org/stamp/stamp.jsp?tp=&arnumber=4416810>; pp. 502-505, Kaiserslauter, Germany.

* cited by examiner ic and updating of applications and their support components.

CONFIGURATION OF AN APPLICATION IN A COMPUTING PLATFORM

TECHNICAL FIELD

Embodiments of the present invention relate to managing an application and its execution environment, and more specifically to automatically configuring an application and support components and to automatically deploying the application and its support components. Some embodiments of the present invention relate to a flexible computing platform that is configured to be a platform-as-a-service (PaaS).

BACKGROUND

Most web applications typically implement multiple layers of functionality to operate. For example, a common web application may use a database layer, an application server layer and the actual web application layer. Components within each of these layers may have their own resource preferences, dependencies, and so forth. Additionally, these components may operate on a single machine or may operate on different machines. In traditional computing platforms, to launch a new application, an administrator writes application code, selects support components, determines nodes that the application and components will run on, installs the application and components on the nodes, and configures the application and components to work with each other. To launch an application using traditional computing platforms accordingly may be time consuming and prone to error. Moreover, when services relied upon by the application change, the administrator typically manually reconfigures the application and its support components to account for such changes.

BRIEF DESCRIPTION OF THE DRAWINGS

Embodiments of the present invention are illustrated by way of example, and not by way of limitation, and can be more fully understood with reference to the following detailed description when considered in connection with the figures in which.

DETAILED DESCRIPTION

Figure 1A:
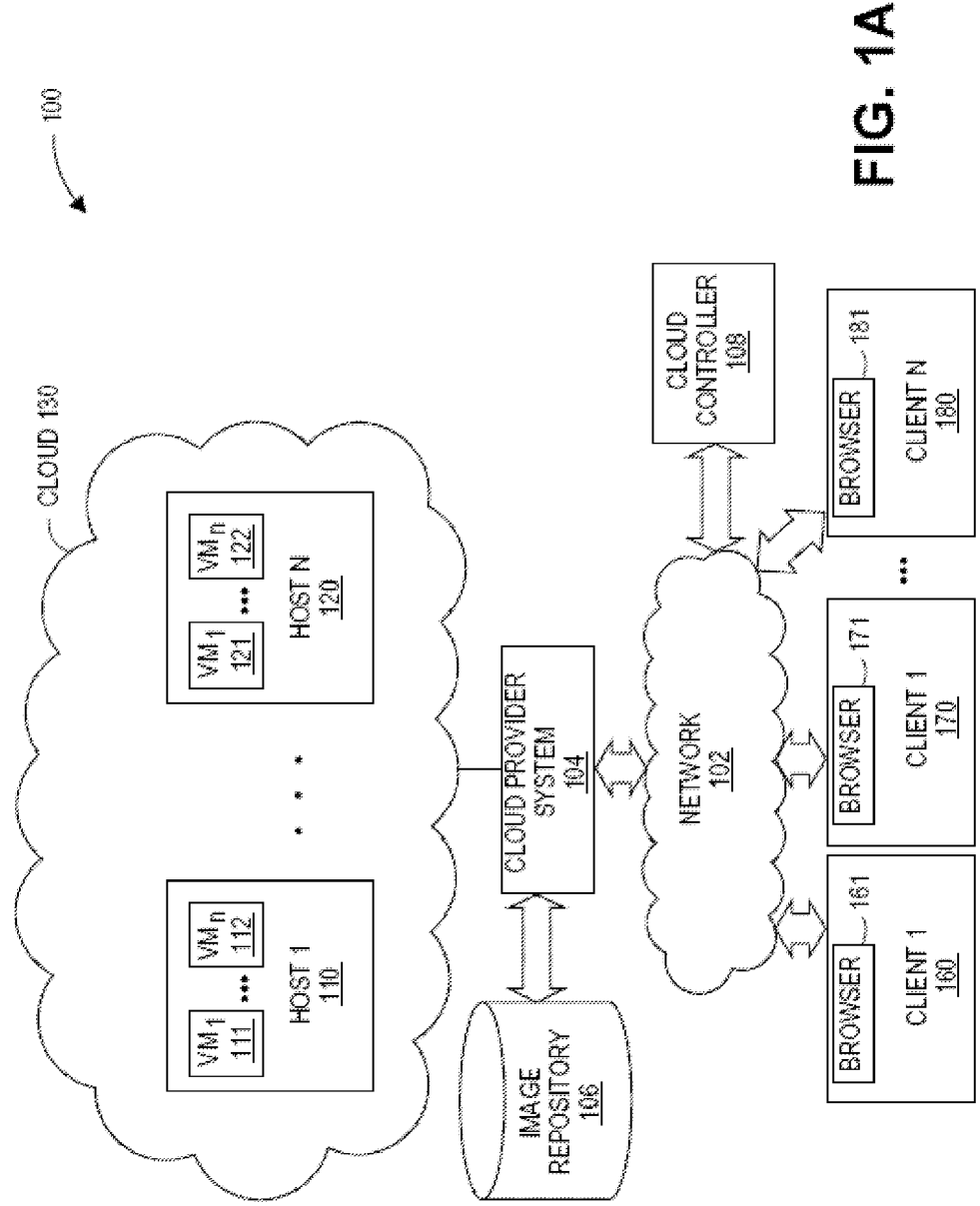
FIG. 1A is a block diagram of a network architecture in which embodiments of the invention may operate.

Described herein are methods and systems for automatically configuring, deploying and managing an application in a computing platform. An application (also referred to as a program) may depend on several support components. Embodiments of the present invention provide a computing platform (also referred to herein as a runtime environment or simply as a platform) that provides these support components. The application may be received by the computing platform along with an application descriptor. The application descriptor may have minimal or extensive information for configuring and deploying the application in the platform. For example, the application descriptor may include identification of one or more capabilities that will be used by of the application (e.g., PHP, MySQL, Mongo, etc.), with no other information. Alternatively, the application descriptor may specify particular configuration details such as a particular MySQL component and configuration to use, specific nodes that the application and its support components are to run on, specific connections to establish between components, and so forth. The application and application descriptor may be received with no additional information, and may be used to automatically set up and execute a distributed application that includes the received application and one or more support components that the application will use.

The computing platform uses the application descriptor to configure and deploy the application. Configuring the application may include identifying components for the platform that provide specified capabilities to the application, and configuring the application and the identified components. Configuring and/or deploying the application may additionally or alternatively include determining nodes to install the application and components on, installing the application and/or some components on a first node (or nodes) and installing the application and/or other components on a second node (or nodes). Configuring and/or deploying the application may additionally include establishing connections between components and/or the application. In one embodiment, the platform manages connections between components and/or the application using a publish-subscribe model. Components and/or the application may publish connection endpoints, and other components and/or the application may subscribe to those connection endpoints. When a connection endpoint is modified, the platform may automatically update the subscribers to that connection endpoint to maintain connections.

For conventional hosted applications such as web applications, designing, configuring, deploying and maintaining the application can be quite complex. Accordingly, application providers typically invest considerable resources into manually developing, configuring and deploying such applications. Often the application deployment is sufficient for a current version of an application, but will not work for a next version of the application, or will not work if parameters deviate from assumptions. Embodiments of the present invention provide a platform (execution environment) that automatically handles the configuring, deploying, managing, scaling, etc. of an application (including its support components). The platform can take user provided application code and set up an entire distributed application based on the provided code and a provided application descriptor, with no additional user input. The platform can additionally adapt to changing demands and input parameters to continually provide an optimal configuration and deployment for an application and support components of the application. This enables the application provider to focus efforts on the business logic of the application, without having to worry about any of the underlying infrastructure.

FIG. 1A is a block diagram of a network architecture 100, in which embodiments of the invention may operate. The network architecture 100 includes a cloud 130 managed by a cloud provider system 104. The cloud 130 provides virtual machines, such as virtual machines 111, 112, 121, and 122, which may be arranged into a cluster or clusters. Each virtual machine is hosted on a physical machine configured as part of the cloud 130. Such physical machines are often located in a data center. For example, virtual machines 111 and 112 are hosted on physical machine 110 in cloud 130 provided by cloud provider 104. The cloud provider system 104 and cloud 130 may be provided as an infrastructure as a service (IaaS) layer. The cloud provider system 104 and cloud 130 may be provided by, for example, Amazon's® Elastic Compute Cloud (EC2®). Users can interact with applications executing on cloud-based virtual machines using client computer systems, such as clients 160, 170 and 180, via corresponding web browser programs 161, 171 and 181.

Note that a multi-tenant architecture may be used instead of, or in addition to, a virtualization architecture. A multi-tenant architecture provides a software application that is designed to virtually partition its data and configuration, and provide a customized virtual application instance to different clients. In a multi-tenancy environment, multiple customers may share the same application, running on the same operating system, on the same hardware or virtual machine, and/or with the same data storage mechanism. A multi-tenant architecture may be combined with virtualization to provide insulating facilities that support one or multiple levels of multi-tenancy. For example, each virtual machine may host an application that provides a multi-tenant application. If a multi-tenant platform or environment is used in addition to virtual machines, then parts of virtual machines may be arranged into a cluster or clusters as well as entire virtual machines. For the sake of clarity, the example of virtual machines will be discussed herein. However, it should be understood that the principles discussed herein may also be applied to multi-tenant architectures.

Clients 160, 170 and 180 are connected to hosts 110, 120 and the cloud provider system 104 via a network 102, which may be may be a private network (e.g., a local area network (LAN), a wide area network (WAN), intranet, or other similar private networks), a public network (e.g., the Internet), or a combination thereof. Each client 160, 170, 180 may be a mobile device, a personal digital assistant (PDA), a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.), and may manage the execution of applications in the cloud 130. In one embodiment, the cloud controller 108 provides platform packages associated with different applications to the cloud provider 104. A platform package is a pre-generated image containing code for a platform that can be provided to the cloud provider 104 and stored in an image repository 106. This image may be a virtual machine image or an image of a physical system. The platform package may provide a complete computing platform on which application code and/or code for support components can run. The platform may provide an infrastructure that enables applications and support components to communicate, scale, backup, use shared or distributed file systems, and so forth. This computing platform may be provided to clients 160, 170, 180 in a platform-as-a-service (PaaS) model.

Upon receiving a command identifying a specific platform package, the cloud provider 104 may retrieve the corresponding image from the image repository 106, create an instance of it and load it on the host 110, 120 to run on top of a hypervisor (not shown). The command may be received from the cloud controller 108 or a user (e.g., a system administrator) via a console computer or a client machine. The hosts 110, 120 may execute the platform package to provide a computing platform on which applications can run.

The image repository 106 may reside locally or remotely and may represent a single data structure or multiple data structures (databases, repositories, files, etc.) residing on one or more mass storage devices, such as magnetic or optical storage based disks, solid-state drives (SSDs) or hard drives. In addition to storing platform packages, the image repository 106 may also store application packages and/or support component packages, which may be loaded onto a host and run on a hypervisor in a similar manner as the platform packages. The cloud provider 104 or the cloud controller 108 may also load an application package on the host 110, 120 to run on top of the platform package or on top of a component package. Additionally, application packages and/or component packages may be stored in one or more other repositories (not shown) residing locally or remotely instead of, or in addition to, the image repository 106.

As used herein, a component package is a reusable software package that can run on the platform. A component is a smallest unit of encapsulated code that is usable on the platform. Component packages may include executable code that provides a capability (such as a service), or may include instructions for accessing one or more underlying capabilities of the platform (e.g., services such as a distributed file system). A component may declare inputs and outputs and a capability or capabilities of the component. These inputs and outputs may be exposed as connectors that can be connected to for providing inputs into the component and/or for receiving outputs from the component. A component can be used (e.g., by an application) without any knowledge of what is inside the component or how it works. Accordingly, a component package may be developed independent of any specific application package. Examples of component packages include component packages that provide a PHP functionality, a Java runtime functionality, a MySQL master capability, a MySQL slave capability, a read capability, a write capability, and so on. A component may have multiple different profiles, each of which provide a different mode of operation for the component.

One example of support component packages are cartridges. Cartridges are component packages that include one or multiple support components along with additional information identifying abstract features provided by the support components. Cartridges may share a similar construction, such that cartridges can be loaded and unloaded from the platform core during execution in accordance with needs of the application 240 or other installed components. A cartridge can expose one or multiple different components for use by other components and/or by applications. One cartridge may include multiple components and provide multiple capabilities. Additionally, the same capability may be exposed by multiple different cartridges. For example, a PHP capability may be exposed by a PHP cartridge and by a Zend Server® cartridge.

In one embodiment, cartridges include one or multiple profiles, each of which may cause the cartridge to run in a particular mode of operation. Each profile provides a different base configuration for deploying a cartridge. Different profiles for a cartridge may enable different support components included in that cartridge, may specify functional and/or resource requirements of the cartridge, and so forth. A profile may internally cause components to instantiate and connect together to provide a specific capability or capabilities. For example, a first profile for a MySQL cartridge may cause the cartridge to run in a single server mode, and a second profile for the My SQL cartridge may cause the cartridge to run in a master-slave mode with a single master and multiple slaves. In the second example, the profile may cause the master node and the slave nodes to be instantiated and then connected together.

When an application is to be created for execution on the platform (e.g., on hosts 110, 120), a client 160, 170, 180 may provide application code (e.g., an application package) to cloud provider system 104. In one embodiment, the user provides the application code using an upload mechanism such as running the git "push" command. Alternatively, the user may provide the application code, for example, using file transfer protocol (ftp), a representation state transfer (REST) application programming interface (API), etc. Cloud provider system 104 may assign a virtual machine (e.g., VM 111) to the client. The virtual machine may then create an application container for the new application that will maintain state information for that application (e.g., in an application descriptor runtime state). The application container may include a default application descriptor that may be edited by an administrator. Additionally, the application container may be associated with an application name and/or version number, which may be provided by a user. In addition to creating the application container, the virtual machine may create a repository and/or directory for that application, which may reside on the virtual machine. The application descriptor is a comprehensive metadata structure that can be used to describe how to connect components and applications, how to duplicate components and applications, ways to run components in different modes, how to handle high availability, scaling and/or backup, or any other feature of an application. The application descriptor is described in greater detail below with reference to FIG. 1B.

The virtual machine may use the application descriptor to determine support components that will be used for the application and profiles of the support components to use. The virtual machine may configure the application and the support components, and may determine a deployment arrangement for the application (e.g., a number of node to use, which components will run on which nodes, etc.). The virtual machine may then cause additional virtual machines to be assigned to running the application, and may cause the application and/or components to be installed on those virtual machines. The virtual machines may start their components, and the application may then be made available to clients 160, 170, 180.

Figure 1B:
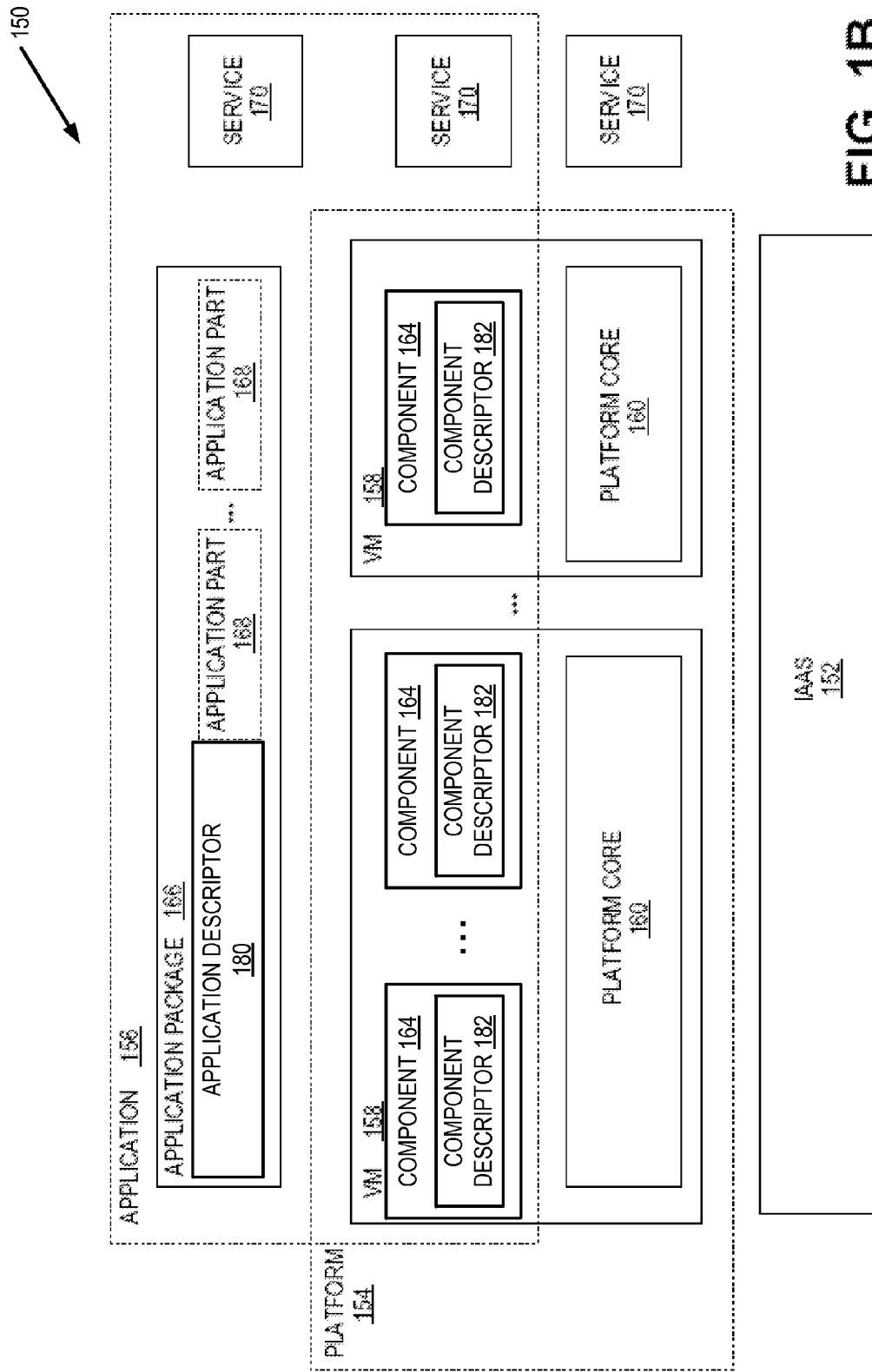
FIG. 1B is a block diagram of one embodiment of a Platform-as-a-Service (PaaS) approach for facilitating the execution of a web application in a cloud.

FIG. 1B is a block diagram of one embodiment of a Platform-as-a-Service (PaaS) environment 150 for facilitating the execution of a web application (or other application) in a cloud. The PaaS environment 150 includes an Infrastructure-as-a-Service (IaaS) 152, which consists of hardware (e.g., one or more processors, memory, IO devices, etc.) and a hypervisor (not shown), and a platform 154 running on the IaaS 152. The platform 154 may be delivered as an auto-clustering virtual machine image (or multiple different auto-clustering virtual machine images), resulting in one or more virtual machines 158, each containing a platform core 160 and a one or more components 164. Each VM 158 may be a node of the platform 154.

The platform core 160 may include a guest OS with a kernel, distributed services, a data transport, data services, monitors and/or other functionality. Distributed services allow communication between nodes when the application runs on multiple nodes arranged in a cluster executing on one or more hypervisors in one or more hosts. Each node may include a separate instance of the platform 154, or may include a different subset of the platform (e.g., a specific component or components of the platform). Some embodiments of the platform core 160 are described with reference to FIG. 2 below.

The components 164 form a layer (or multiple layers) that provides a variety of middleware, framework and other support software for the application 156. In various embodiments, the middleware/framework components 164 can include such components as Java®, Apache®, MySQL®, PHP®, JBoss®, and Tomcat®.

Application 156 includes an application package 166 containing an application descriptor 180. The application descriptor 180 may be a description of the architecture for a particular application, and may include information that can be used to assemble the application 156. The application descriptor 180 may include, for example, information on a configuration of application parts, support components and/or an underlying platform core. The application descriptor 180 may specify capabilities that will be used by the application (e.g., functional requirements of the application, services to be relied upon by the application, etc.). The application descriptor 180 may additionally include, or may rely on the platform to determine, additional configuration and deployment parameters. For example, the application descriptor 180 may additionally include an instruction that a supplier of a capability is to communicate with suppliers of other capabilities. The application descriptor 180 can provide detailed information for configuring the application, or may include minimal information. The less information that is provided, the more application 156 relies on the platform 154 to automatically choose an optimal configuration for the application 156. Accordingly, the application descriptor 180 may describe a multi-tiered application on the cloud, including flexible scaling, flexible routing, load balancing, high availability, clustering, scaling, etc.

In addition to the application descriptor 180, the application package 166 may include one or more application parts 168, which may correspond to different individually deployable modules of the application 156. For example, a first application part 168 may include application code or logic, and another application part 168 may include static data that will be farmed out to a content delivery network. Application 156 may be an n-tiered web application based on languages such as Java, Ruby, Python, PHP or the like. An application package 166 may be provided by a user or created automatically based on information about the application that is provided by a user via a user interface or by other means.

The platform core 160 and components 164 may be provided by the PaaS provider. Components 164 are not packaged with the application 156. Instead, the application package 166 expresses in the application descriptor 180 a dependency on services (also referred to herein as capabilities) provided by components 164. The platform 154 may then import the appropriate components 164 at deployment time.

In one embodiment, components 164 include component descriptors 182 that describe capabilities of the components 164 as well as connectors (also referred to as connection endpoints) that identify ways of connecting to the components (e.g., types of data that the component may receive, address, port and/or protocol information that can be used to access the component, types of data that the component outputs, and so forth). The component descriptor 132 may also define capabilities (e.g., services) that the component relies upon. The component descriptor 132 may have a similar structure and include similar types of data to the application descriptor 180. For example, a MySQL component may include a component descriptor that describes the component's MySQL capabilities and ways of accessing those MySQL capabilities.

The platform 154 automates the process of configuring, deploying and managing the application 156. The platform 154 may parse the application descriptor 180 to determine capabilities relied upon by the application 156. The platform 154 may then identify components 164 that can provide those capabilities and select components 164 for providing those capabilities. Once components 164 are selected for the application 156, the platform 154 may connect and configure those components 164 and the application parts 168 based on information included in the application descriptor 180 and/or the component descriptors 182. Accordingly, the platform 154 may be an application level "dependency injection" system in which individual components are built without any knowledge about other components or how to connect to them. The application 156 and any component may declare what it needs, and the platform 154 my select and provide components that satisfy the declared needs.

The dependency injection may function at the application level without any regard to programming languages, operating systems, execution environments, etc. used by any individual components. Accordingly, the different components that run in the platform 154 may be written in different programming languages, may run in different memory spaces, may run on different nodes, may have separate runtimes, etc. For example, a MySQL component may not know how a Tomcat component connects to it, and the Tomcat component may not know how to connect to the MySQL component. The MySQL component may publish three different connection endpoints (e.g., that may each provide the same data but formatted in different ways). If the Tomcat component expects a particular connection (e.g., a Java database connectivity (JDBC) connection), it may specify that it can communicate via a JDBC connection. The platform 154 may analyze the component descriptor of the Tomcat component and the component descriptor of the MySQL component, and may match a JDBC connection of the MySQL component to the JDBC connection of the Tomcat component based on the connection endpoints that these components are both exposing. The platform 154 may additionally start VMs 158 for the application 156, install components and/or application parts on the various VMs, and start the components and/or application parts.

Note that the PaaS environment 150 may also include external services 170, that are external to the platform 154, on which the application 156 may depend. The platform 154 may identify external services 170 that are relied upon by the application 166, and may connect application parts 168 and/or components 164 to the external services 170.

Figure 2:
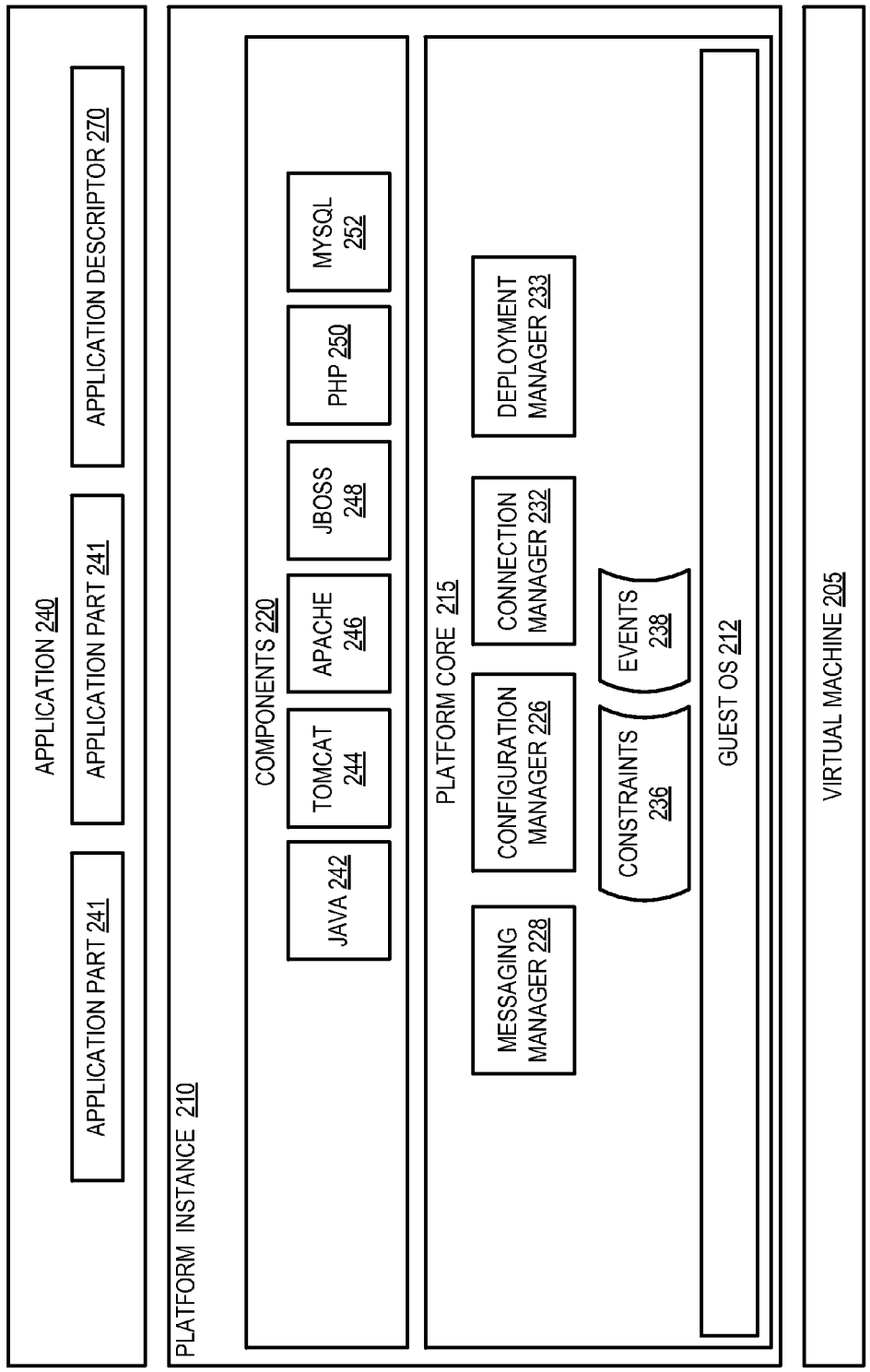
FIG. 2 is a block diagram of a computing platform instance that hosts an application and runs in a virtual machine, in accordance with one embodiment of the present invention.

FIG. 2 is a block diagram of a platform instance 210, in accordance with one embodiment of the present invention. The platform instance 210 supports execution of an application 240. The application 240 may be a web application or another type of application. In one embodiment, the application is a Java application or a PHP application. The application may include multiple application parts 241. The platform instance 210 may run on a virtual machine 205, which in turn runs on a host that includes a hypervisor. The platform instance 210 includes a platform core 215, and one or more components 220.

Components 220 may each provide support functionality (capabilities) used by the application 240 and/or by other components 220. Examples of components include a Java component 242, a Tomcat component 244, an Apache component 246, a JBoss component 248, a PHP component 250 and a MySQL component 252. However, many other types of components are also possible. Each component 220 provides specific capabilities, and may be associated with multiple profiles. Application 240 may include an application descriptor 270 that identifies specific capabilities that application 240 will use to run. In one embodiment, at least some components 220 are provided by cartridges (not shown). Components may also be built into the platform and/or may be included in an application package.

The platform core 215 provides a framework that enables components and the application 240 to communicate with one another, and that enables the platform instance 210 to communicate with (and form clusters with) other platform instances running on other nodes. The platform core 215 also includes functionality for configuring and deploying the application 240 and components 220, for managing the application 240 and components 220, and for scaling the numbers and types of platform instances. The platform core additionally includes a guest OS 212.

In one embodiment, platform core 215 includes a messaging manager 228 that communicates with a cloud controller. When a node is to be instantiated, the platform notifies messaging manager 228 of the decision. Messaging manager 228 then sends a message to the cloud controller to cause the cloud controller to communicate with the IaaS layer to provision a new node.

In one embodiment, platform core 215 includes a configuration manager 226. Configuration manager may parse the application descriptor 270 to identify capabilities that the application 240 will rely upon. The configuration manager 226 may then identify those components 220 that provide the specified capabilities, and may load those components in the platform instance 210 (or in another platform instance that may communicate with platform instance 210). The configuration manager 226 may also identify particular profiles to use for configuring the selected components. Additionally, some of the components may specify additional capabilities that those components rely upon. If any such components 220 will be loaded into platform instance 210, then configuration manager 226 may determine the additional capabilities that the components will rely upon, and find additional components that will provide those capabilities. The configuration manager 226 may then load those additional components into the platform instance 210 (or into another platform instance).

In one embodiment, platform core 215 includes a deployment manager 233. Deployment manager 223 may determine a number of nodes to use for an application, and may further determine which application parts and/or components will run on those different nodes. Once new nodes are brought online, deployment manager 233 adds the new nodes to an appropriate cluster.

In one embodiment, each VM 205 includes the same platform instance 210 and an instance of the application 240. Accordingly, each machine runs an instance of all components provided to the application by the platform. Therefore, when the system scales up the application, a new VM 205 includes a new copy of the application 240 and all components 220.

In another embodiment, different VMs include distinct platform instances. For example, a first platform instance may include a Java component 242 and host the application 240, and a second platform instance may include a MySQL component 252. Deployment manager 233 may group nodes that include the first platform instance into a first cluster, and may group nodes that include the second platform instance into a second cluster. This first cluster and second cluster may further be arranged into a larger cluster. This division of the platform into multiple different platform instances, which may communicate with one another, increases the flexibility and level of control over the platform.

Components 220 may include or be associated with a constraint or set of constraints 236. The constraints 236 may specify minimum resources, architecture specifications, capabilities relied upon and/or other preferences of the component. Examples of constraints 236 include minimum processor power, minimum number of processor cores, minimum memory, minimum bandwidth, maximum allowed packet loss rate, minimum security settings, additional required components, other components that cannot run with a component in a platform instance, and so forth. Deployment manager 233 may use the constraints 236 to provision the virtual machine 205 and/or an underlying host.

In one embodiment, deployment manager 233 compares constraints of the components and application parts to each other. Based on the constraints, deployment manager may determine a number of nodes to provision, and which components will run on which nodes. Those components that are to run together on a node may be defined as a group. Deployment manager 233 may also determine which nodes the application (or application parts) will be active on. Based on the constraints, deployment manager 233 may determine that some components and/or the application are to be run on the same node. Alternatively, deployment manager 233 may determine that some components are to run on different nodes. Note that deployment manager 233 may modify groups and relocate components and/or applications dynamically as system preferences and/or conditions change.

In one embodiment, platform core 215 includes a connection manager 232. As part of configuration, configuration manager 226 may determine how components and/or application parts will communicate. Once connections (communication channels) are established, connection manager 232 may maintain those connections 232. The components 220 can issue commands to request system information such as information about the architecture and packages installed, and can further communicate with the platform and each other via communication channels such as the file system, inter-process communication (IPC), and a network.

Connection manager 232 manages connections between components 220. Connection manager 232 also manages connections between the application 240 (or application components) and various components 220. Each component 220 and the application 240 (or application component) may expose one or multiple connection endpoints. Components 220 (or an application 240 or application component) that provides a connection endpoint may provide it as a subscription service. Any other component 220 (or application 240 or application component) may subscribe to that subscription service. For example, a server may publish a network connection endpoint. Any client may then subscribe to that network connection endpoint to connect to the server. The connection manager 232 sits in the middle and manages the connection between the endpoints. For example, if one connection endpoint (connection publisher) moves, then the connection manager 232 may inform or update (either actively or passively) the other endpoints (connection subscribers) of the new address for the moved connection endpoint.

Connection manager 232 may manage multiple different types of connections. One type of managed connection is a network connection, which may include a network address and a port (or network addresses and ports). The network connection may further include a protocol, such as MySQL, hypertext transport protocol (HTTP), transmission control protocol (TCP), user datagram protocol (UDP), real time streaming protocol (RTSP), real time transport protocol (RTP), etc. Another connection type is a connection via a file system. For example, one endpoint may write a file or a library to a location in the file system, and the other endpoint may read that file or library. As one endpoint moves around, or begins using a different directory, the connection manager 232 can inform the other endpoint of the move or different directory. The connection manager 232 may also manage in-process connections, such as loading of a shared object, pipes, inter-process communications (IPC), shared memory connections, and so on. All of these and other types of connections may be managed by connection manager 232 using the publish subscribe system.

Note that components 220 and/or application 240 may extend connection types by sending additional information than what is specified by the connection type. For example, a MySQL component may extend a transmission control protocol/internet protocol (TCP/IP) connection type to send a username and password in addition to standard TCP/IP information. The MySQL component may alternatively or additionally extend the TCP/IP connection type to send a JDBC connection string in addition to the standard TCP/IP information.

Components 220 and application 240 can trigger events 238 such as threshold violations, scaling events, notification triggers, state change events, migration events, transition events, etc. These events can modify connection endpoints. Connection manager 232 may receive such events, and may determine components and/or application parts that subscribe to a connection endpoint that generated the event. Connection manager 232 may then reconfigure those subscribing components and/or application parts to maintain their connection to the modified connection endpoint. For example, a component may be a server that is resource constrained. Deployment manager 233 may migrate the component to a new node that has additional resources. The component may generate a migration event to indicate that will be migrated or has been migrated to the new node. The connection manager 232 may receive the migration event and update any components that subscribe to a connection endpoint of that component. These updates may be performed by modifying a portion of the application descriptor runtime state 304 that relates to the subscribing components.

Figure 3:
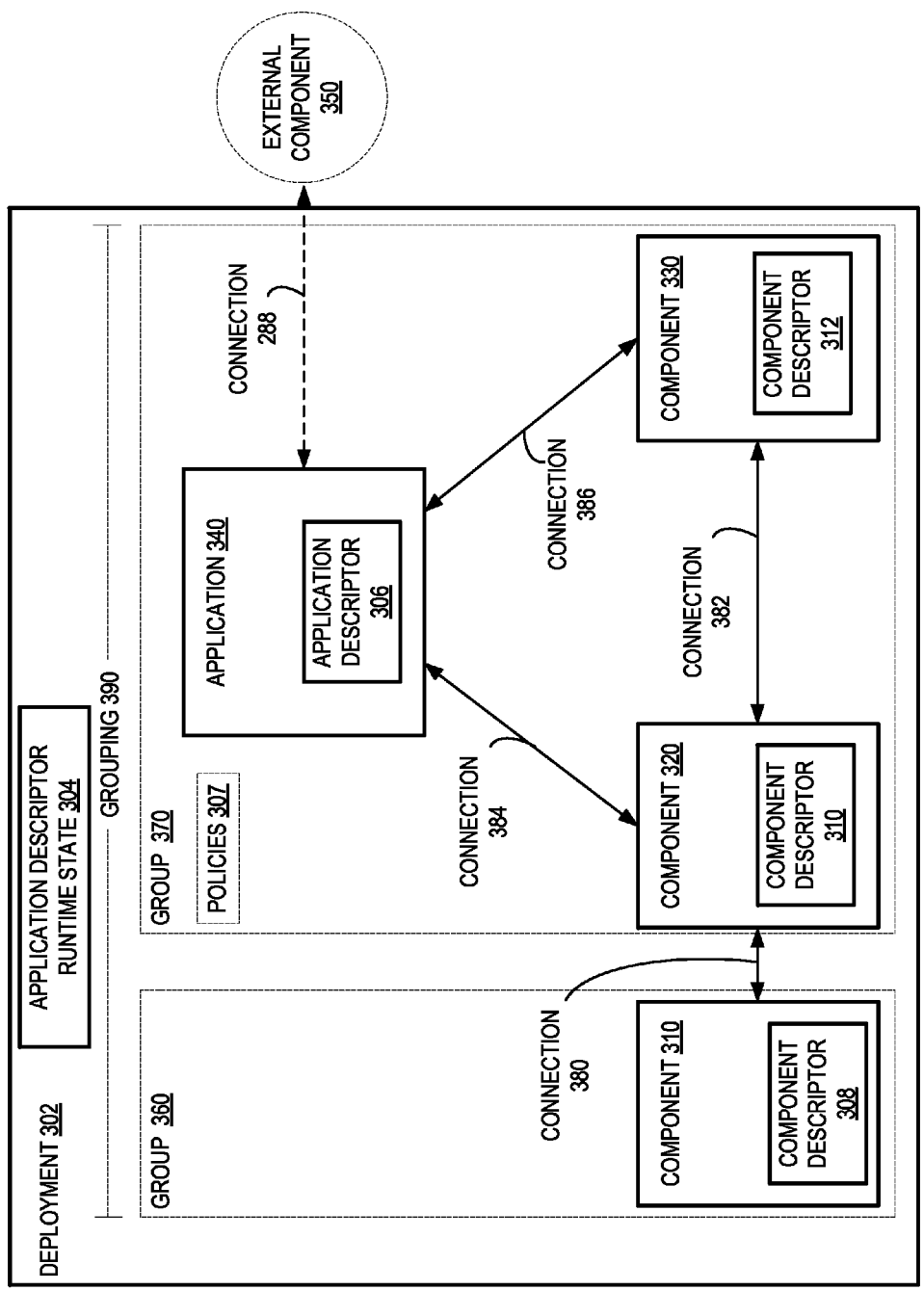
FIG. 3 illustrates a logical architecture of an application deployment in a computing platform, in accordance with one embodiment of the present invention.

FIG. 3 illustrates a block diagram of a logical architecture of a deployment 302 for an application 340, in accordance with one embodiment of the present invention. A deployment 302 is a collection of platform instances that form a platform and an application that runs on the platform.

The deployment 302 includes a collection of components 310, 320, 330 and an application 340. The components 310, 320, 330 and application 340 communicate via a series of connections. In the illustrated example, component 310 communicates with component 320 via connection 380. Component 320 communicates with application 340 via connection 384 and with component 330 via connection 382. Additionally, application 340 communicates with component 330 via connection 386. Multiple different types of connections may be used, such as network connections, shared memory connections, shared directory connections, and so forth. Additionally, two components (or a component and the application 340) may form multiple different types of connections between them. The application 340 and/or components 310, 320, 330 may also form connections (e.g., connection 388) with an external component 350. The external component may be, for example, a web service utilized by the application 340. The connections enable components and the application to utilize services and functionality provided by other components.

The deployment 302 includes a grouping 390. The grouping 390 is an arrangement of components 310, 320, 330 and application 340 in the deployment 302 into one or more provisioning groups 360, 370. Grouping 390 may also include policies 307. Each provisioning group 360, 370 may represent a tier of the application deployment 302. Each provisioning group 360, 370 may be a cluster of nodes that each include the same platform instance (and thus that each includes the same component or components. In one embodiment, each node in a provisioning group is identical to each other node in the provisioning group. For example, all nodes in provisioning group 360 may include a machine with four processor cores and 2 GB of RAM, and may host a platform instance that includes component 310. A group may be formed by determining constraints of the different components, and then resolving which components can run together on a node based on those constraints. In one embodiment, the group 360 is installed onto nodes in a first cluster, group 370 is installed onto nodes in a second cluster, and the first cluster and second cluster together are arranged into a larger third cluster. In one example deployment, provisioning group 360 may be a web serving tier and component 310 may be a web server. Provisioning group 370 may be a second tier that includes an application server (component 320), application code that is deployed into that application server (application 340), and a database (component 330). Note that multiple groups may run on a single node in some instances.

The deployment 302 may include an application descriptor runtime state 304. The application descriptor runtime state 304 may include all information describing the deployment 302. The application descriptor 366 and component descriptors 308, 310, 312 may be static metadata. The application descriptor runtime state 304 may include initial information included in an application descriptor 306 and in component descriptors 308, 310, 312. The application descriptor runtime state 304 may additionally include runtime state configuration and deployment information. When the application is assembled and loaded into memory, the application descriptor 366 is expanded and loaded into memory as well. As the application 340 and its components change, the application descriptor runtime state 304 keeps track of where each component is running, which group is running on which nodes, which components are in which nodes, the addresses of nodes and of components running on those nodes, how many nodes there are, how components are connected, when and how to scale groups, etc. The application descriptor runtime state 304 may additionally identify cartridges that are loaded, which profiles the cartridges are running, which components the cartridges are providing, how many copies of cartridges are running, the runtime resources that are being used, and so on. The application descriptor runtime state 304 may include information on all connections 380, 382, 384, 386, 388. If any connection is modified, then the application descriptor runtime state 304 may be updated to reflect that modification. A copy of the application descriptor runtime state 304 may be maintained on each node hosting group 360 and on each node hosting group 370.

FIGS. 4-10 are flow diagrams of various embodiments of methods for configuring, deploying and/or managing a platform as a service (PaaS). The methods are performed by processing logic that may comprise hardware (circuitry, dedicated logic, etc.), software (such as is run on a general purpose computer system or a dedicated machine), or a combination of both. In one embodiment, the methods are performed by the platform 154 running on the host 110, 120, and in particular by a module or modules of a platform core within the platform 154.

Figure 4:
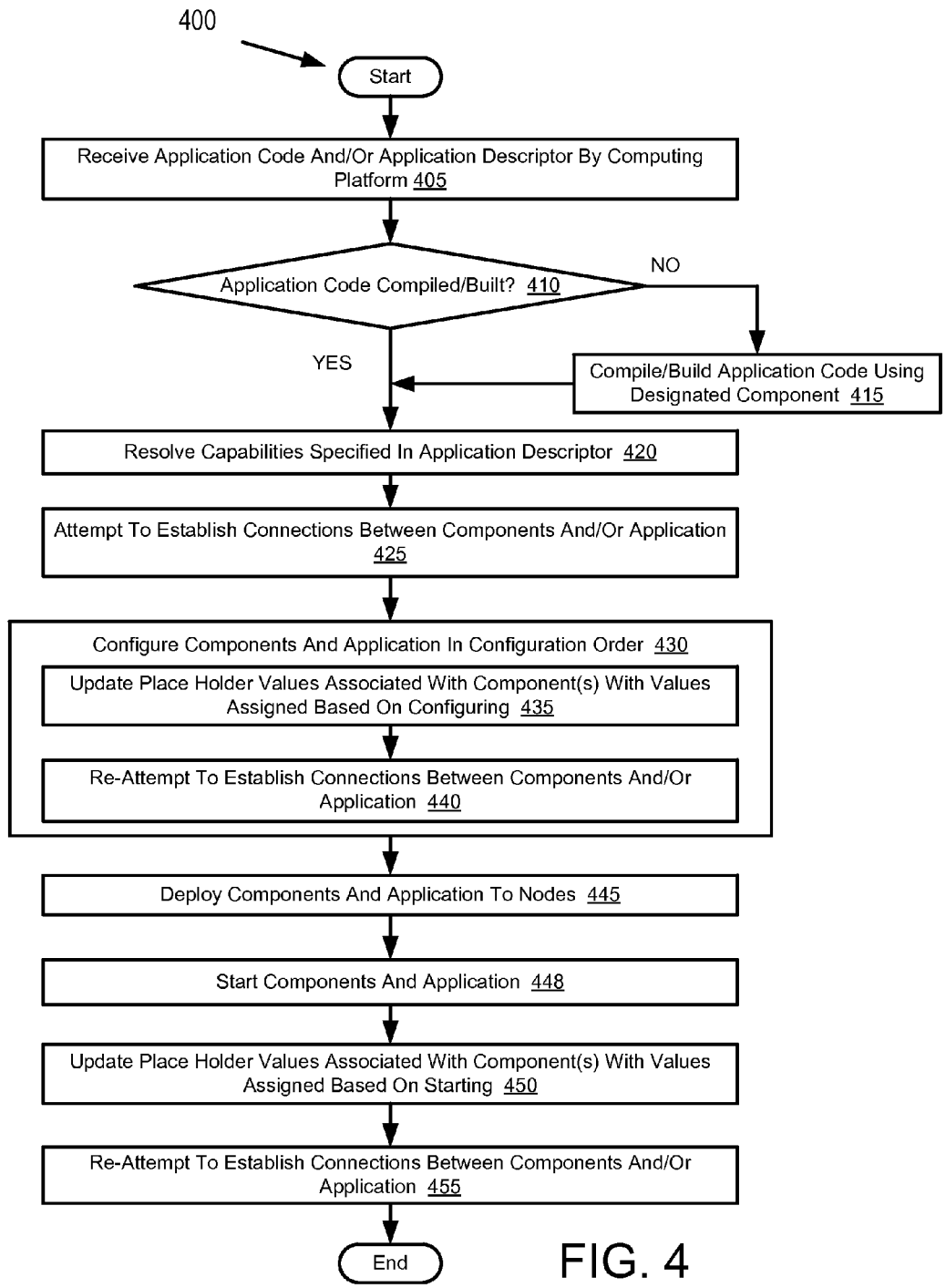
FIG. 4 is a flow diagram of one embodiment for a method of configuring and deploying an application.

FIG. 4 is a flow diagram of one embodiment for a method 400 of configuring and deploying an application. At block 405 of method 400, processing logic receives application code and an application descriptor. Upon receipt (or predicted receipt) of the application code, processing logic may create an application container for the application on a node in the platform (e.g., on a virtual machine running in the cloud). The application code may be received along with an application descriptor. Alternatively, processing logic may generate a default application descriptor, which may be edited by an administrator.

At block 410, processing logic determines whether the received application code has already been built or still needs to be compiled (e.g., for a Java application) or may exist uncompiled (e.g., for a PHP application or other type of application). If the application code has not been built or compiled, then it may be received along with an indication of a building or compiling capability that the application code will rely upon. This indication may be included in the application descriptor. If the application code has not been built or compiled, the method continues to block 415. Otherwise, the method proceeds to block 420.

At block 415, processing logic selects a component that can provide the specified building or compiling capability (e.g., a build tool or compiler that can build or compile the application code). Once the component is selected, processing logic compiles or builds the application code using the selected component. The method then proceeds to block 420.

At block 420, processing logic resolves capabilities specified in the application descriptor. Resolving the capabilities may include determining components and/or cartridges that can provide the capabilities, determining profiles to use for those components and/or cartridges, and loading those components and/or cartridges using the selected profiles.

At block 425, processing logic attempts to establish connections between the components and/or application (or application parts). This may include identifying which components and/or applications should be connected together, identifying communication mechanisms supported by components that are to be connected, and then attempting to connect those components via the identified communication mechanisms. Processing logic may determine that a connection should be established between any component or application that relies upon a capability and a component that provides that capability. Additionally, the application descriptor may include information specifying that components that provide some capabilities are to connect to components that provide other capabilities. For example, processing logic may figure out which components are to be connected, call the components providing the connection endpoints, collect information from the components, and provide the collected information to subscribing components. Note that some connections may not be established at this point and/or some established connections may not yet be valid (e.g., due to lack of information on specific IP addresses and ports (e.g., for network connections), memory addresses (for shared memory space connections), and so forth).

At block 430, processing logic configures the application (including all application parts) and the components. Configuration may be the process of resolving variables for a component, cartridge, application or application part that is being configured. In one embodiment, processing logic determines a configuration order for the application parts and/or components. The configuration order may be based on dependencies between the components and/or application parts. In one embodiment, those components that depend on other components are started after the other components on which they depend. Therefore, additional information on the other components from which they depend will be available when it comes time to configure the dependant components. Note that some components may be configured before those other components that they will depend on. For example, a PHP cartridge may be configured before another component that it depends from, and may push its configuration information down to those other components from which it depends. Those other components may then be configured using information passed along by the PHP cartridge.

In one embodiment, configuration order is maintained in a dependency tree. Each node in the dependency tree may represent a component, cartridge, application, or application part. Leaves of the dependency tree, which do not depend on any of the components or applications, may be configured first, followed by nodes at a next level of the dependency tree, and finally by a root (or roots) of the dependency tree.

Configuration may be a multi step process. Each component and application may come with a set of configuration files, which may be written into an application descriptor runtime state. The configuration files may include variable place holders. At block 435, processing logic may update place holder values associated with a configured component (or components) with runtime values. These variable place holders may be replaced with runtime state information as configuration commences. Examples of variable place holders include environment variables such as place holders for log file locations, port numbers, IP addresses, node identifiers, etc.

After a component, cartridge, application or application part is configured, and the placeholder values have been replaced with runtime values, at block 440 processing logic may reattempt to establish connections between components and/or the application. Since place holder values have been replaced with runtime values, some connections that were not previously valid or established can now be set up or updated.

At block 445, processing logic determines nodes to which the application and components will be deployed, and deploys the components (or cartridges) and application (or application components) to the designated nodes. The assignment of components to nodes may be made based on constraints specified for those components. Note that processing logic may set up multiple different nodes in a cluster, each of which may run different components and perform different tasks. Processing logic may determine which components to deploy where in an automated fashion without an administrator having to manually specify which components will be started where. At this point, the application is created and deployed, but stopped.

At block 448, processing logic may then start the components and application in a start order. The start may be performed in response to receiving a start instruction. The start order may be determined based on dependencies between components and/or the application. In one embodiment, the start order is the same as the configuration order. Alternatively, the start order may vary from the configuration order. In one embodiment, the start order is determined based on a dependency tree.

Not all place holder values may be replaced with runtime data at the time of configuration. Some such place holder values may not be replaced until a component has started. Accordingly, at block 450, processing logic may update some placeholder values with runtime state information. At block 455, processing logic again reattempts to establish connections between the components and/or the application. Some connections may not be set up until the dependant and dependee have both been started (and place holder values have been replaced with runtime state information generated after the components have started). Such connections may be set up at this time. The application is then up and running.

Note that there may be two different levels for application creation. Application creation may be performed at a cluster level and at a node level. At the cluster level, creating the application may include creating an application container that maintains state information for the application and all its components. When an application container is created at a cluster level, processing logic will additionally create at least one node level application object associated with the cluster level application container. The node level application object may create local users that will be used to run the application. This may include setting up security policies to ensure that the application is isolated from other applications. Processing logic may additionally assign the node level application object a range of internet protocol (IP) addresses so avoid any conflict of IP addresses and/or ports between multiple applications running on the same nodes. The node level application object may additionally include a repository created by processing logic to provide source code management on that node.

Figure 5:
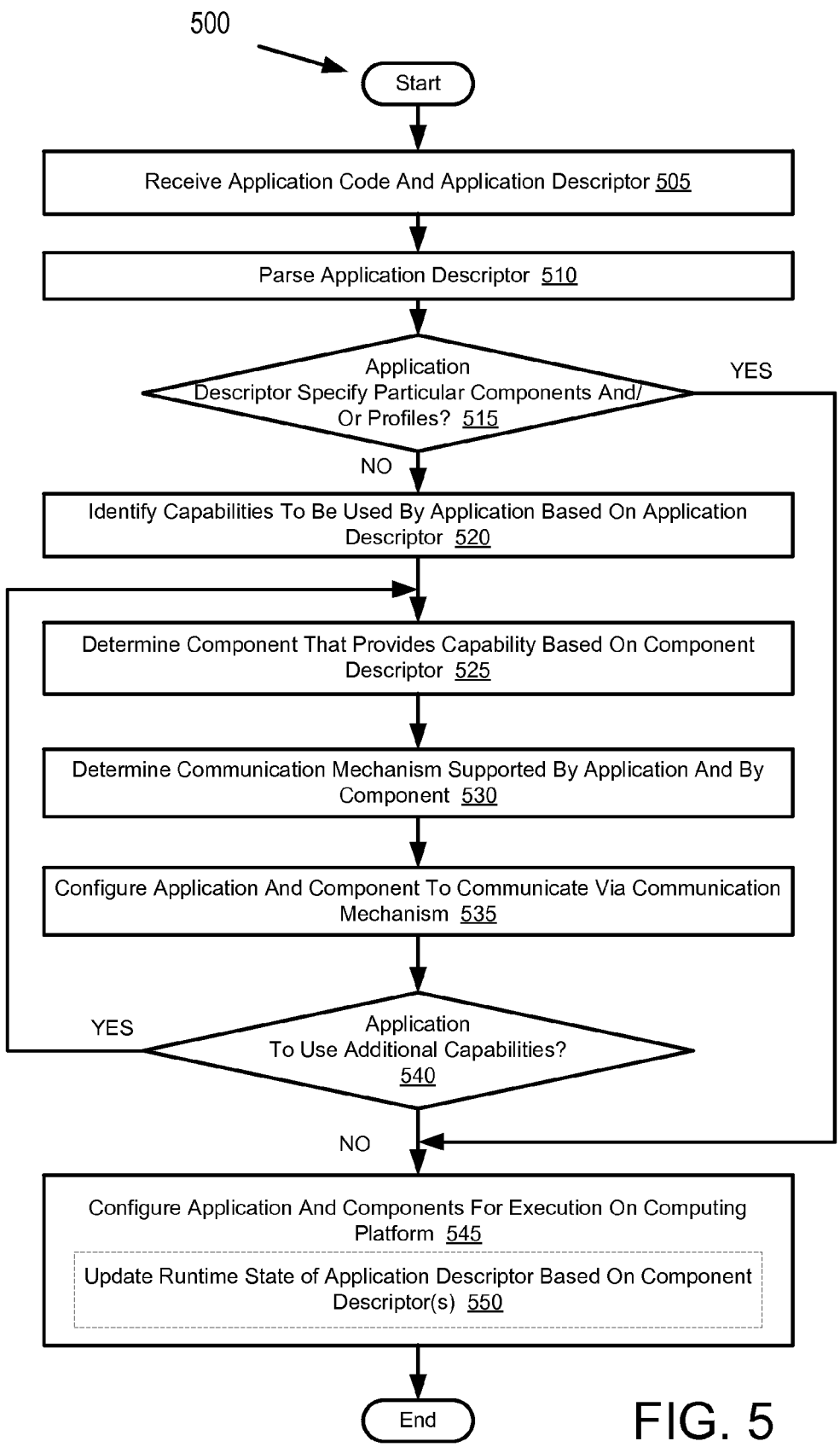
FIG. 5 is a flow diagram of another embodiment for a method of configuring an application.

FIG. 5 is a flow diagram of another embodiment for a method 500 of configuring an application. At block 505 of method 500, processing logic receives application code and an application descriptor. At block 510, processing logic parses the application descriptor 510. The application descriptor may include detailed configuration and setup information or minimal information. For example, the application descriptor may include a simple list of capabilities to be relied upon by the application (e.g., that the application will use PHP and MySQL). Alternatively, the application descriptor may specify particular cartridges to use, particular profiles of those cartridges to use, particular groups to divide the cartridges and application into, particular nodes to run the cartridges and/or application on, particular connections to establish, and/or any other information.

At block 515, processing logic determines whether the application descriptor specifies particular components, cartridges and/or profiles. If so, the method continues to block 545. Otherwise, the method proceeds to block 520.

At block 520, processing logic identifies capabilities to be used by the application based on the application descriptor. At block 525, processing logic determines a component (or cartridge) that can provide one of the identified capabilities based on the component descriptor. At block 530, processing logic determines a communication mechanism supported by the application and by the component. This may include determining connection endpoints of the application and endpoint, and identifying connection endpoints that share the same type (e.g., network connection, an inter-process connection, a file system connection, etc.) and protocol. At block 535, processing logic configures the application an the component to communicate via the communication mechanism. Note that at block 530, processing logic may additionally or alternatively determine a communication mechanism supported by two components (or cartridges), and at block 535 processing logic may configure the two applications to communicate via that communication mechanism.

At block 540, processing logic determines whether the application will use any additional capabilities that have not been resolved (for which components or cartridges that provide the capabilities have not been set up). If so, the method returns to block 525. Otherwise, the method continues to block 545.

At block 545, processing logic configures the application and its components for execution on a computing platform. This may include updating a runtime state of the application descriptor based on the component descriptors of the determined components (block 550). Such updating may include copying information from the component descriptors into the application descriptor runtime state, for example. The method then ends.

Figure 6:
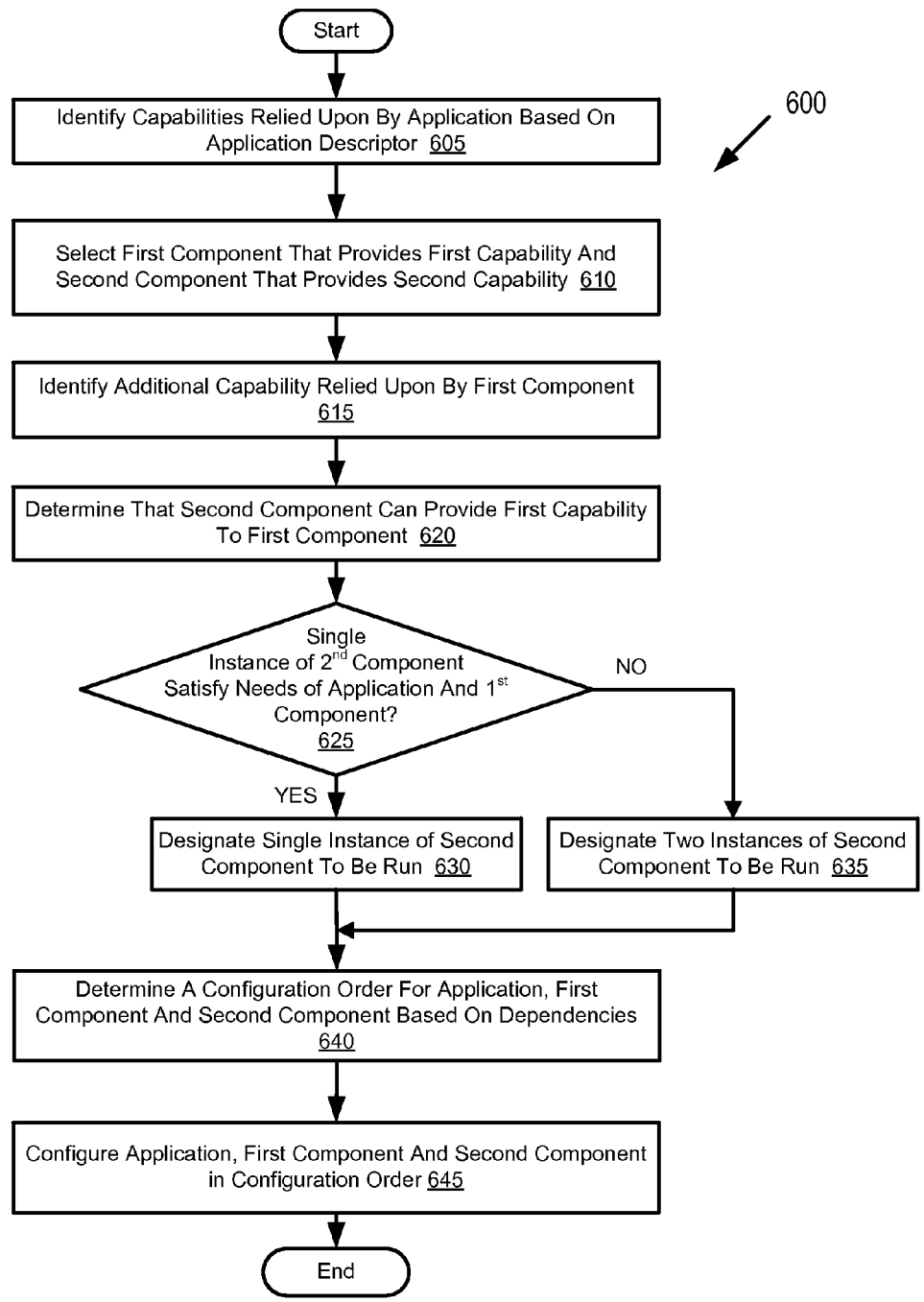
FIG. 6 is a flow diagram of yet another embodiment for a method of configuring an application.

FIG. 6 is a flow diagram of yet another embodiment for a method 600 of configuring an application. At block 605 of method 600, processing logic identifies capabilities to be relied upon by an application based on an application descriptor (e.g., an application descriptor file). At block 610, processing logic selects a first component that provides a first capability and a second component that provides a second capability. At block 615, processing logic identifies an additional capability relied upon by the first component. At block 620, processing logic determines that a second component can provide the first capability to the first component.

The application descriptor runtime state allows that among several components, if multiple components share a dependency to a sub component, that subcomponent can provide capabilities to the multiple components. Accordingly, at block 625, processing logic determines whether a single instance of the second component can be used by both the application and the first component. If so, the method continues to block 630. Otherwise, the method proceeds to block 635.

At block 630, processing logic suggests and/or designates a single instance of the second component to be shared by the first component and by the application. Accordingly, a single instance of the second component may be run, which may conserve resources.

At block 635, if a single instance of the second component cannot provide a capability to both the application and the first component, then processing logic designates two separate instances of the second component to be run. This may occur, for example, if the application relies on a cartridge running a first profile, and the first component relies on the same cartridge, but running a second profile.

At block 640, processing logic determines a configuration order for the application, first component and second component based on dependencies. Those components that do not depend on any other components may be started first, followed by those components and/or the application that depends on them. At block 645, processing logic configures the application, the first component and the second component in the configuration order. The method then ends.

Figure 7:
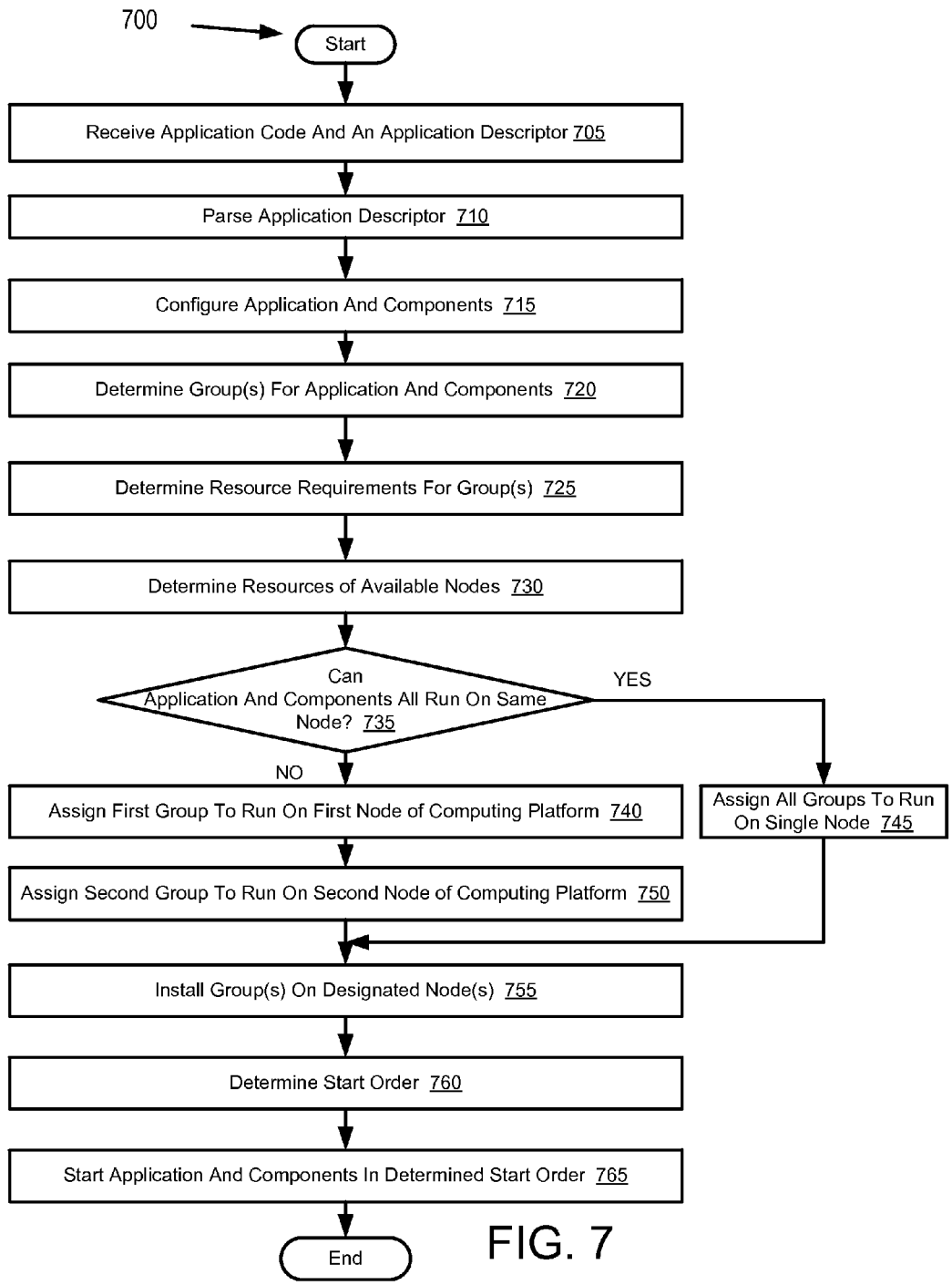
FIG. 7 is a flow diagram of another embodiment for a method of configuring and deploying an application in a computing platform.

FIG. 7 is a flow diagram of another embodiment for a method 700 of configuring and deploying an application in a computing platform. At block 705 of method 700, processing logic receives application code and an application descriptor. At block 710, processing logic parses the application descriptor. At block 715, processing logic configures the application and any components (or cartridges) based on the application descriptor.

At block 720, processing logic determines one or more groups for the application and the components. Processing logic may determine the groups based on resource requirements and/or other constraints of the application and the components. For example, the constraints may specify that a first component and a second component are to run on separate nodes. The constraints may also specify that the first component and a third component are to run on the same node.

At block 725, processing logic determines an amount of resources that should be provided to the groups. At block 730, processing logic determines resources of available nodes that can be provisioned. The available nodes may be virtual machines that can be brought online with specified resource parameters (e.g., specified amounts of memory, processing power, network bandwidth, etc.).

At block 735, processing logic determines whether the application and all components can run on a single node. If so, the method continues to block 745, and processing logic assigns all groups to that node. Otherwise, the method continues to block 740, and processing logic assigns the first group to run on a first node of the computing platform. At block 750 processing logic assigns the second group to run on a second node of the computing platform. At block 755, processing logic installs the groups on the specified nodes. Subsequently, at block 760, processing logic may determine a start order for the components and the application. A different start order may be determined for each node. Additionally, a cluster wide start order may be determined. For example, a first component may be started on a first node, followed by a second component on a second node, followed by the application on the first node. At block 765, processing logic starts the components on the nodes in the start order. The method then ends.

Figure 8:
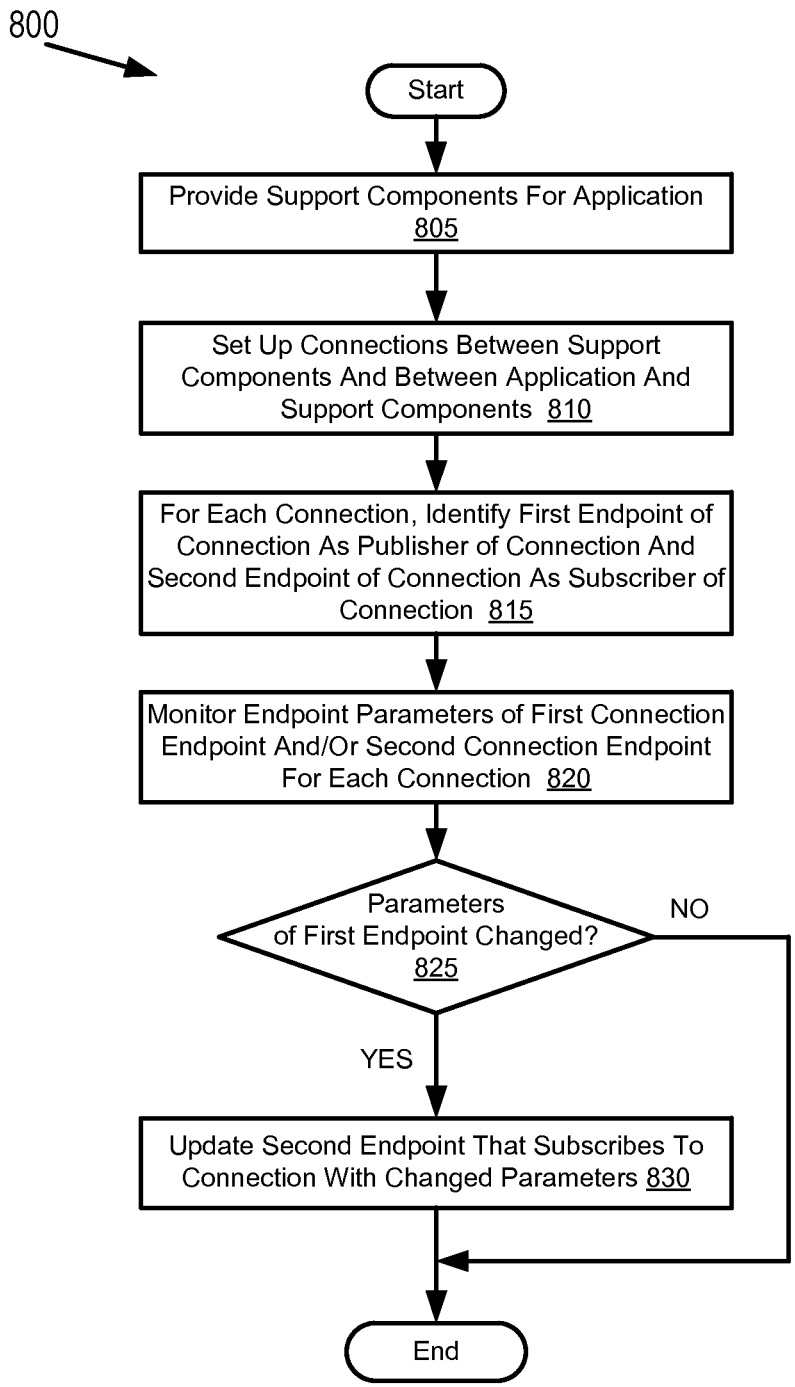
FIG. 8 is a flow diagram of one embodiment for a method of managing connections between components within a platform.

FIG. 8 is a flow diagram of one embodiment for a method 800 of managing connections between components within a platform. At block 805, processing logic provides support components for an application. Processing logic may select the support components based on advertised needs of the application. At block 810, processing logic sets up connections between support components and between an application and support components.

At block 815, for each connection, processing logic identifies a first endpoint of the connection as a publisher of the connection and a second endpoint of the connection as a subscribed of the connection. Processing logic may additionally identify the second endpoint as a publisher of the connection and the first endpoint as a subscriber of the connection.

At block 820, processing logic monitors endpoint parameters of the first endpoint and/or the second endpoint for each connection. The nature of the endpoint parameters may depend on the type of connection. For example, endpoint parameters for a network connection may include an network address and port number. At block 825, processing logic determines whether the parameters of the first endpoint has changed. Processing logic may also determine whether the parameters of the second endpoint has changed. If the parameters of the first endpoint have changed, the method continues to block 830, and the processing logic updates the second endpoint that subscribes to the connection with the changed parameters. If an address of the second endpoint has changed, the method continues to block 830, and processing logic updates the first endpoint that subscribes to the connection with the changed parameters. If the first endpoint's parameters (and/or second endpoint's parameters) have not changed, the method ends.

Figure 9:
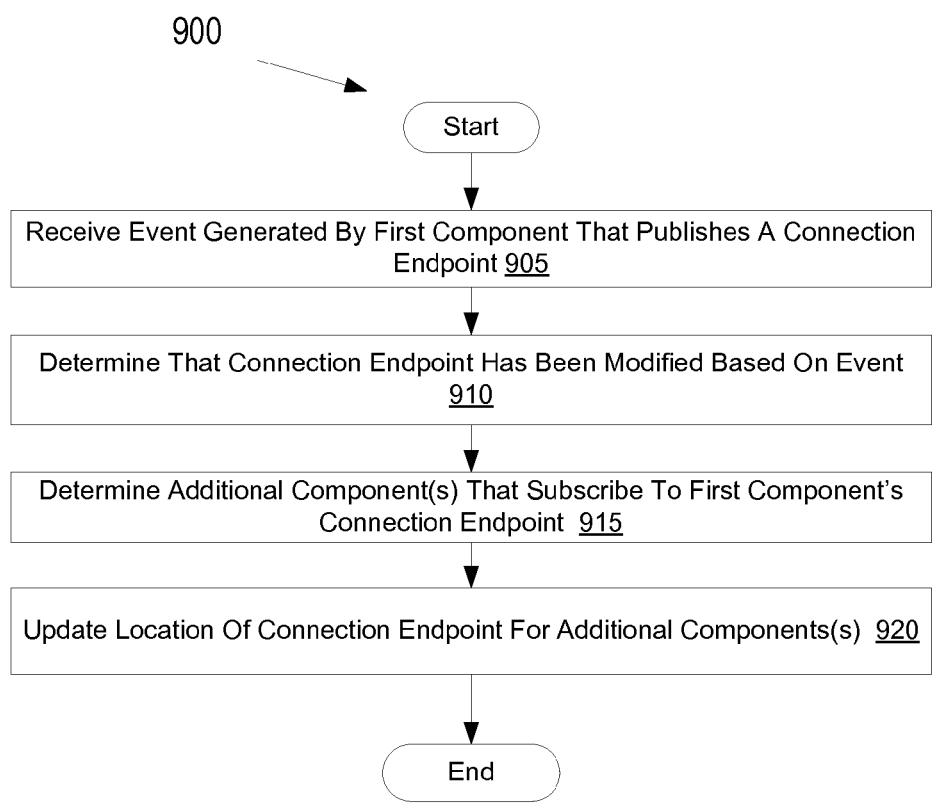
FIG. 9 is a flow diagram of another embodiment for a method of managing connections between components within a platform.

FIG. 9 is a flow diagram of another embodiment for a method of 900 managing connections between components within a platform. At block 905, processing logic receives an event generated by a first component that publishes a connection endpoint. The event may be any type of event related to the endpoint connection. For example, the event may be a status event, a scaling event, a migration event, a transformation of services event, and so on. The event may identify that a log file's location has changed, that a network location (e.g., IP address and/or port has been changed), that a protocol to use to connect to an endpoint has changed (e.g., a change from a MySQL connection to an http connection, a TCP connection, a UDP connection, an RTSP connection, or an RTP connection, for example), en event indicating that a publisher will stop providing the endpoint, en event that the connection endpoint will additionally be provided at another port or location, and so forth. At block 910, processing logic determines that the connection endpoint has been modified based on the event. At block 915, processing logic determines additional components that subscribe to the first component's connection endpoint. At block 920, processing logic updates a location of the connection endpoint for those additional components. This update may be made in a runtime state of an application descriptor (e.g., in a region of the runtime state associated with an additional component) or in another data structure associated with the additional component. By updating the connection endpoint information for subscribing components as it changes, processing logic maintains a connection between the first component and the additional components.

Figure 10:
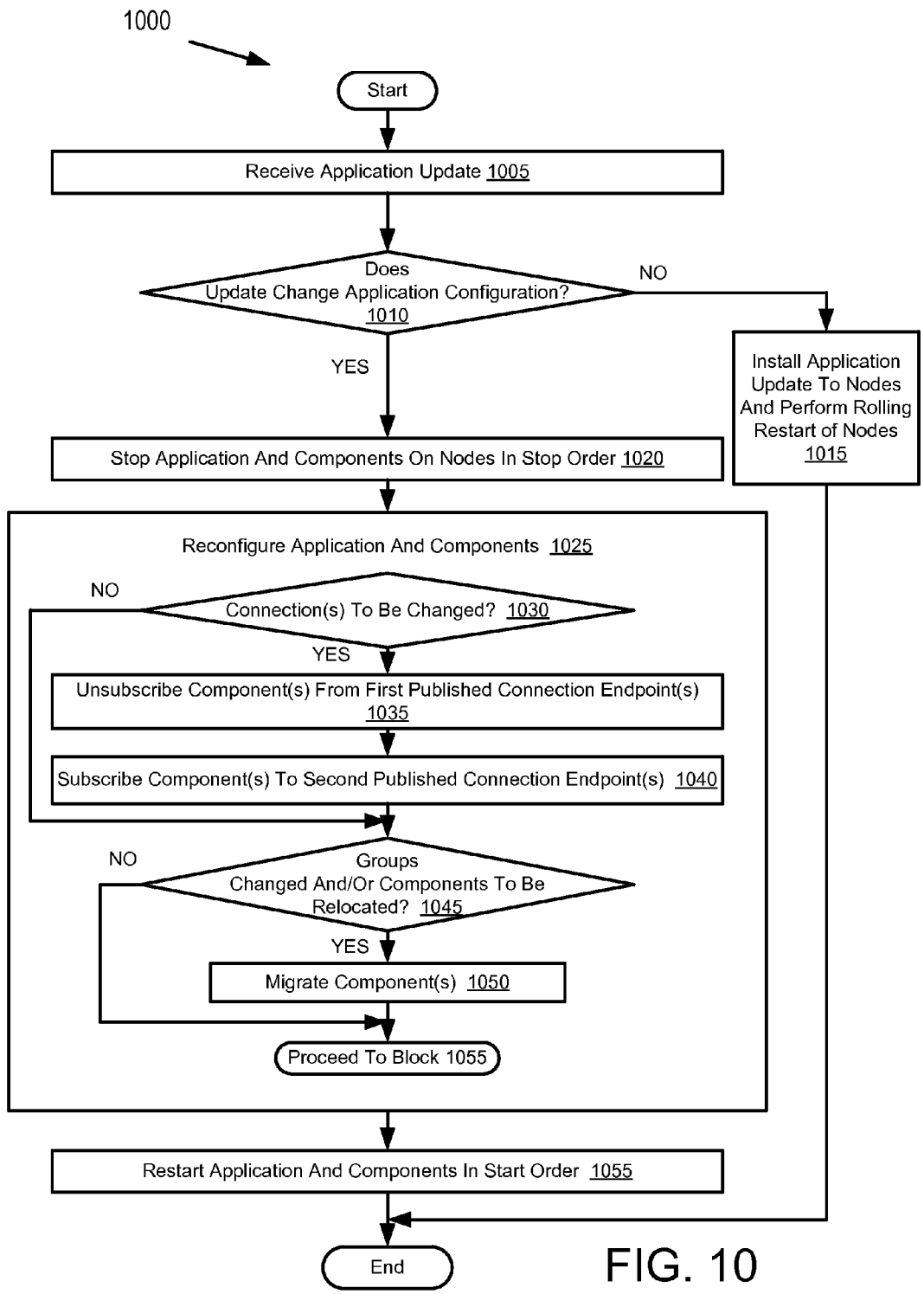
FIG. 10 is a flow diagram of one embodiment for a method of updating an application deployed in a computing platform.

FIG. 10 is a flow diagram of one embodiment for a method 1000 of updating an application deployed in a computing platform. At block 1005 of method 1000, processing logic receives an application update for an application. The update may be received via an API such as a REST API, via a git "push" command, or via some other mechanism. In one embodiment, processing logic monitors data (e.g., configuration files, application code, an application descriptor, etc.) in a directory or repository. If the data changes, then processing logic may determine that an application update has been received. The application update may include updated application code and/or may include a modified application descriptor. At block 1010, processing logic determines whether the update changes an application configuration. If the update does not change an application configuration, the method continues to block 1015, and a rolling restart may be performed. Otherwise, the method continues to block 1020. Note that the rolling restart is an optional feature. In an alternative embodiment the method continues to block 1020 regardless of whether the update changes an application configuration.

At block 1015, processing logic installs the application update to nodes one at a time, and performs a rolling restart of the nodes. This may include stopping one node, updating the application code for that node, and restarting that node, and then repeating this process on a next node. This process may be performed one node at a time until all nodes have been updated.

At block 1020, processing logic stops the application and components on all nodes. The application and components may be stopped in a stop order, which may be based on dependencies between the components and application. The stop order may be a reverse of a start order that may have been used to start the application and components.

At block 1025, processing logic reconfigures the application and its components. In one embodiment, processing logic performs any of methods 400-700 for the reconfiguration. In one embodiment, at block 1030, processing logic determines whether any connections are to be changed. If so, processing logic continues to block 1035. Otherwise, the method proceeds to block 1045.

At block 1035, processing logic unsubscribes a component (or components) to a first published subscription endpoint. At block 1040, processing logic then subscribes those components to a second published endpoint or endpoints. This process may be performed for multiple different connection endpoints.

At block 1045, processing logic determines whether any groups are to be changed or relocated based on the update. If so, the method continues to block 1050. Otherwise, the method proceeds to block 1055. At block 1050, processing logic migrates one or more components (or the application) from one node to another node. At block 1055, processing logic restarts the application and the components in a start order. The method then ends.

Figure 11:
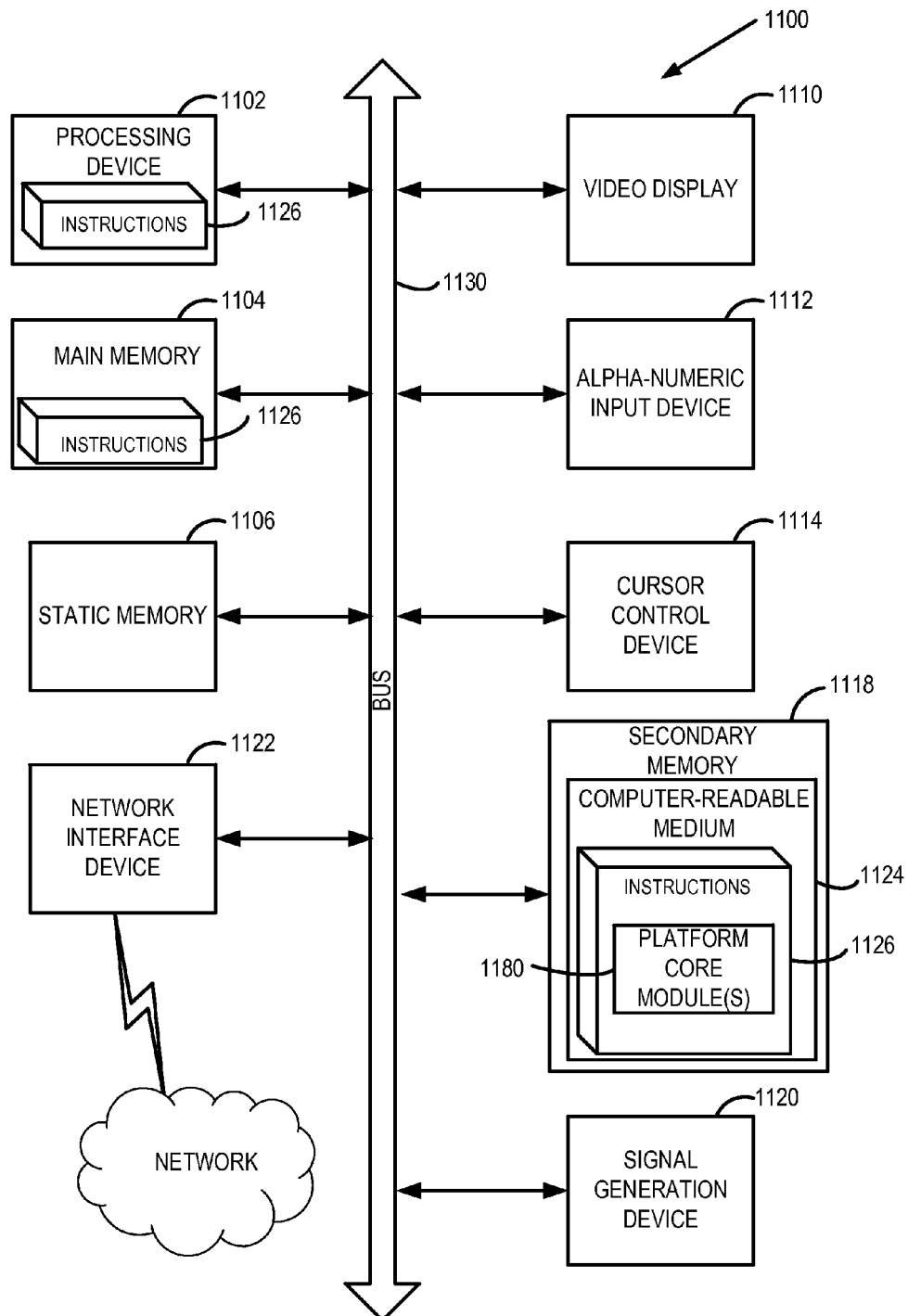
FIG. 11 illustrates a diagrammatic representation of a machine in the exemplary form of a computer system.

FIG. 11 is a diagram of one embodiment of a computer system for facilitating the execution of a web application in a cloud. Within the computer system 1100 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host 110, 120 in a cloud 130, a cloud provider system 104, a cloud controller 108 or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processing device 1102, a main memory 1104 (e.g., read-only memory (ROM), flash memory, dynamic random access memory (DRAM) such as synchronous DRAM (SDRAM) or DRAM (RDRAM), etc.), a static memory 1106 (e.g., flash memory, static random access memory (SRAM), etc.), and a secondary memory 1118 (e.g., a data storage device in the form of a drive unit, which may include fixed or removable computer-readable storage medium), which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute the instructions 1126 for performing the operations and steps discussed herein.

The computer system 1100 may further include a network interface device 1122. The computer system 1100 also may include a video display unit 1110 (e.g., a liquid crystal display (LCD) or a cathode ray tube (CRT)) connected to the computer system through a graphics port and graphics chipset, an alphanumeric input device 1112 (e.g., a keyboard), a cursor control device 1114 (e.g., a mouse), and a signal generation device 1120 (e.g., a speaker).

The secondary memory 1118 may include a machine-readable storage medium (or more specifically a computer-readable storage medium) 1124 on which is stored one or more sets of instructions 1126 embodying any one or more of the methodologies or functions described herein. In one embodiment, the instructions 1126 include instructions for one or more modules of a platform core 1180. The instructions 1126 may also reside, completely or at least partially, within the main memory 1104 and/or within the processing device 1102 during execution thereof by the computer system 1100, the main memory 1104 and the processing device 1102 also constituting machine-readable storage media.

The computer-readable storage medium 1124 may also be used to store the instructions 1126 persistently. While the computer-readable storage medium 1124 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 1126, components and other features described herein can be implemented as discrete hardware components or integrated in the functionality of hardware components such as ASICS, FPGAs, DSPs or similar devices. In addition, the instructions 1126 can be implemented as firmware or functional circuitry within hardware devices. Further, the instructions 1126 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually these quantities may take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "determining," "updating," "subscribing," "configuring," "installing," "storing," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Thus, a method and apparatus for automatically establishing a support environment for a program is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
upon receiving application code and an application descriptor of an application, identifying, by a processing device executing a virtual machine, a capability to be used by the application in view of the application descriptor, wherein the capability specifies a functional requirement of the application rather than a specifically identified software service;
determining, by the processing device, a component that provides the functional requirement of the application specified by the identified capability in view of a component descriptor of the component, wherein the component comprises executable code of a specific software service that is usable by the virtual machine, and wherein the component descriptor specifies one or more capabilities provided by the component;

identifying an additional capability to be used by the component in view of the component descriptor, wherein the component descriptor further specifies the additional capability to be used by the component;

determining an additional component that provides the additional capability;

determining that the application descriptor further specifies that the application will use the additional capability that is provided by the additional component;

determining that a single instance of the additional component will provide the additional capability to both the application and the component based on at least a profile associated with the additional component, wherein the profile comprises a mode of operation for the additional component that is compatible with both the application and the component; and configuring the application, the component, and the additional component for execution by the virtual machine.

2. The method of claim 1, further comprising:

identifying, in the application descriptor, an instruction that a provider of the capability is to communicate with a provider of the additional capability;

determining a communication component supported by the component and by the additional component; and configuring the component and the additional component to communicate via the communication component.

3. The method of claim 1, further comprising:

determining dependencies between the application, the component and the additional component;

determining an order in which to configure the application, the component and the additional component in view of the dependencies; and configuring the components in the determined order.

4. The method of claim 1, further comprising:

establishing a first connection between the application and the additional component; and establishing a second connection between the component and the additional component.

5. The method of claim 1, wherein the application descriptor specifies that the component is to be used to provide the capability and that a profile for the component is to be used to configure the component, wherein the profile enables particular features of the component.

6. The method of claim 1, wherein a configuration of application and the component are maintained in a runtime state of the application descriptor, the method further comprising:

starting the component and the application on at least one node of a computing platform; and updating the runtime state of the application descriptor in response to starting the component and the application.

7. A non-transitory computer readable storage medium including instructions that, when executed by a processing device, cause the processing device to:

upon receiving application code and an application descriptor of an application, identify, by the processing device executing a virtual machine, a capability to be used by the application in view of the application descriptor, wherein the capability specifies a functional requirement of the application rather than a specifically identified software service;

determine, by the processing device, a component that provides the functional requirement of the application specified by the identified capability in view of a component descriptor of the component, wherein the component comprises executable code of a specific software service that is usable by the virtual machine, and wherein the component descriptor specifies one or more capabilities provided by the component;

identify an additional capability to be used by the component in view of the component descriptor, wherein the component descriptor further specifies the additional capability to be used by the component;

determine an additional component that provides the additional capability;

determine that the application descriptor further specifies that the application will use the additional capability that is provided by the additional component;

determine that a single instance of the additional component will provide the additional capability to both the application and the component based on at least a profile associated with the additional component, wherein the profile comprises a mode of operation for the additional component that is compatible with both the application and the component; and configure the application, the component, and the additional component for execution by the virtual machine.

8. The non-transitory computer readable storage medium of claim 7, wherein the processing device is further to:

identify, in the application descriptor, an instruction that a provider of the capability is to communicate with a provider of the additional capability;

determine a communication component supported by the component and by the additional component; and configure the component and the additional component to communicate via the communication component.

9. The non-transitory computer readable storage medium of claim 7, wherein the processing device is further to:

determine dependencies between the application, the component and the additional component;

determine an order in which to configure the application, the component and the additional component in view of the dependencies; and configure the components in the determined order.

10. The non-transitory computer readable storage medium of claim 7 wherein the processing device is further to:

establish a first connection between the application and the additional component; and establish a second connection between the component and the additional component.

11. The non-transitory computer readable storage medium of claim 7, wherein the application descriptor specifies that the component is to be used to provide the capability and that a profile for the component is to be used to configure the component, wherein the profile enables particular features of the component.

12. The non-transitory computer readable storage medium of claim 7, wherein a configuration of application and the component are maintained in a runtime state of the application descriptor, wherein the processing device is further to:

start the component and the application on at least one node of a computing platform; and update the runtime state of the application descriptor in response to starting the component and the application.

13. A computing apparatus comprising:

a memory to store instructions; and a processing device, operatively coupled to the memory, to execute the instructions on a virtual machine, wherein the processing device is to:

upon receiving application code and an application descriptor of an application, identify a capability to be used by the application in view of the application descriptor, wherein the capability specifies a functional requirement of the application rather than a specifically identified software service;

determine a component that provides the functional requirement of the application specified by the identified capability in view of a component descriptor of the component, wherein the component comprises executable code of a specific software service that is usable by the virtual machine, and wherein the component descriptor specifies one or more capabilities provided by the component;

identify an additional capability to be used by the component in view of the component descriptor, wherein the component descriptor further specifies the additional capability to be used by the component;

determine an additional component that provides the additional capability;

determine that the application descriptor further specifies that the application will use the additional capability that is provided by the additional component;

determine that a single instance of the additional component will provide the additional capability to both the application and the component based on at least a profile associated with the additional component, wherein the profile comprises a mode of operation for the additional component that is compatible with both the application and the component; and configure the application, and the component, and the additional component for execution by the virtual machine.

14. The computing apparatus of claim 13, wherein the processing device is further to:
  identify, in the application descriptor, an instruction that a provider of the capability is to communicate with a provider of the additional capability;
  determine a communication component supported by the component and by the additional component; and
  configure the component and the additional component to communicate via the communication component.

15. The computing apparatus of claim 13, wherein the processing device is further to:
  establish a first connection between the application and the additional component; and
  establish a second connection between the component and the additional component.

16. The computing apparatus of claim 13, wherein the processing device is further to:
  determine dependencies between the application, the component and the additional component;
  determine an order in which to configure the application, the component and the additional component in view of the dependencies; and
  configure the components in the determined order.

17. The computing apparatus of claim 13, wherein the application descriptor specifies that the component is to be used to provide the capability and that a profile for the component is to be used to configure the component, wherein the profile enables particular features of the component.

* * * * *